US006637650B1

(12) United States Patent
Capurso et al.

(10) Patent No.: US 6,637,650 B1
(45) Date of Patent: Oct. 28, 2003

(54) PRINTABLE SHELF LABEL HAVING A LIQUID CRYSTAL DISPLAY

(75) Inventors: Robert G. Capurso, Bergen, NY (US); Stanley W. Stephenson, Spencerport, NY (US); Dennis B. Schulmerich, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/158,655

(22) Filed: May 30, 2002

(51) Int. Cl.[7] .......................... G06K 15/00

(52) U.S. Cl. .......................... 235/383; 345/50; 345/51; 428/42.1; 235/385

(58) Field of Search .......................... 235/383, 375, 235/385, 451, 488, 492; 705/20; 428/42.1

(56) References Cited

U.S. PATENT DOCUMENTS

| | | | | |
|---|---|---|---|---|
| 5,111,196 A | | 5/1992 | Hunt | 340/825.35 |
| 5,751,257 A | | 5/1998 | Sutherland | 345/2 |
| 6,217,966 B1 | * | 4/2001 | Finster et al. | 428/42.1 |
| 6,253,190 B1 | | 6/2001 | Sutherland | 705/20 |
| 6,269,342 B1 | * | 7/2001 | Brick et al. | 705/20 |

OTHER PUBLICATIONS

USSN: 10/134,185, filed Apr. 29, 2002 by Stephenson et al.

* cited by examiner

*Primary Examiner*—Michael G. Lee
*Assistant Examiner*—Kumiko C. Koyama
(74) *Attorney, Agent, or Firm*—Thomas H. Close

(57) ABSTRACT

A method of making a programmable shelf tag, including the steps of supplying a display element having a single flexible transparent; mounting the display element substrate side down in a window formed in a web of adhesive backed print medium having a die cut area around the display element to form an adhesive label that includes the display element; printing static information on the label of the print medium; supplying a support for mounting the adhesive; and attaching the adhesive label to the support.

41 Claims, 13 Drawing Sheets

PRINTABLE SHELF LABEL HAVING A LIQUID CRYSTAL DISPLAY

FIELD OF THE INVENTION

The present invention relates to a printable label having a flexible display with front electrical contacts to the display.

BACKGROUND OF THE INVENTION

U.S. Pat. No. 5,751,257, issued May 12, 1998 and U.S. Pat. No. 6,253,190 issued Jun. 26, 2001 to Sutherland show a system including a programmable shelf tag having a bistable liquid crystal display for displaying price data and a Universal Product Code (UPC) bar code, wherein the information programmed in the display remains on the display in the absence of power. The shelf tag has a set of synchronizing indicators and corresponding electrical contacts on the front side of the display. The shelf tag is constructed by forming patterned conductive character elements on top and bottom substrates and sandwiching a polymer stabilized liquid crystal between the patterned character elements.

The shelf tag is programmable with a hand-held device that is connected to a central computer that contains inventory and price information. The hand held device can be used to scan the synchronizing indicators to identify the location of the electrical contacts, and supplies the electrical contacts with electrical signals to write appropriate information on the shelf tag. For inventory control and price updates, the hand held device is used to first read the UPC bar code on the shelf tag. If a price needs to be updated, the hand held device is then used to write the appropriate price information into the tag.

One problem with the system as described by Sutherland is that including the UPC as a writable element on the shelf tag significantly increases the complexity and cost of the shelf tag. The resolution needed to produce UPC information requires 113 modules of data, and therefore a corresponding number of contacts on the front of the display. Generally, the UPC bar code for a product is static and does not change for the life of the product.

Another problem is that shelf tags generally include other static information such as a human readable description of the product, unit identification (e.g. per oz. or per 100 sheets). The addition of this extra static information in writable form on the shelf tag would complicate the display structure of the tag to the point of impracticality.

There is a need therefore for an improved shelf tag that avoids the problems noted above.

SUMMARY OF THE INVENTION

The need is met according to the present invention by making a programmable shelf tag that includes a display element having a single flexible transparent substrate, one or more first transparent conductors located on the substrate, a layer of polymer dispersed material located over the first conductor(s), the polymer dispersed material being responsive to an applied electric field for displaying information and having first and second optical states that are both stable in the absence of an electrical field, one or more second conductors located over the polymer dispersed layer for applying the electric field to the polymer dispersed material between the first and second conductors and a plurality of display contacts located on the backside of the display for making electrical connection to the first and second conductors of the display; the display element is mounted substrate side down in a window formed in a web of adhesive backed print medium having a die cut area around the display element to form an adhesive label that includes the display element; printing static information on the label of the print medium; a support for mounting the adhesive label includes a plurality of support contacts having first conductive portions for providing contact to the conductors of the display element and second conductive portions in an area outside the adhesive label for making electrical contact with the display from the front of the display element, the support includes a layer of conductive adhesive over the first conductive portions of the support contacts. The adhesive label is attached to the support such that the display contacts are in electrical contact with the support contacts via the conductive adhesive, whereby the first and second conductors are electrically addressable from the front side of the display assembly.

ADVANTAGES

The present invention allows a completed sheet with displays attached to be sold to retail outlets. Retailers can buy the completed sheet and supports, print the static information on the sheet, detach the printed labels from the sheet and affix them to the support. When a price changes, the display on the label can readily be updated, leaving the static information unchanged.

BRIEF DESCRIPTION OF THE DRAWINGS

FIG. 4 is a front view of a printable sheet with individual die cut labels positioned in an array with perforated windows through the sheet and a backer for the displays to show through;

DETAILED DESCRIPTION OF THE INVENTION

Figure 1:
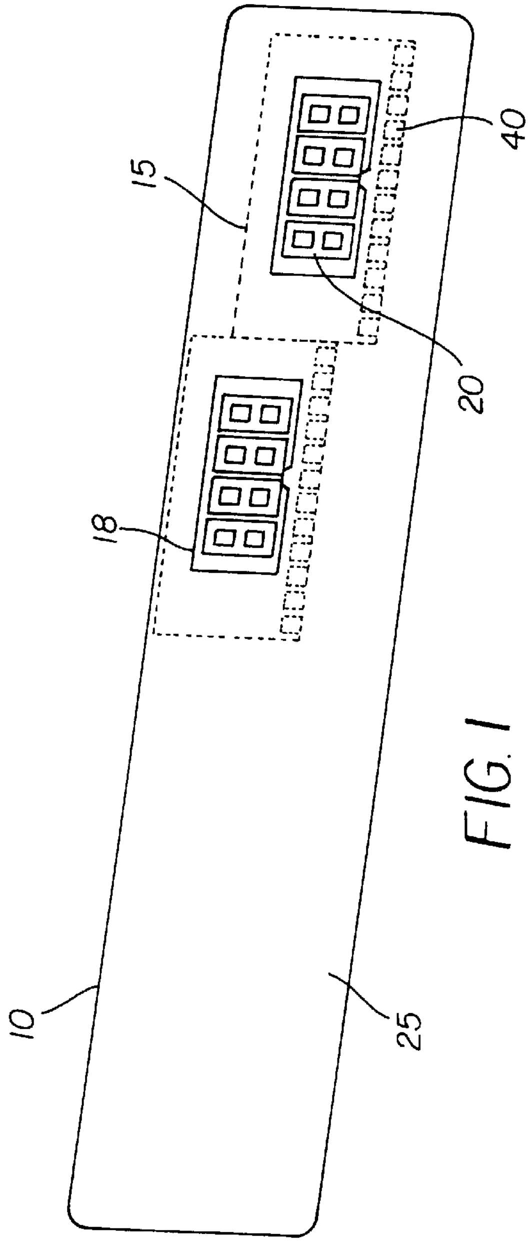
FIG. 1 is a perspective front view of a shelf tag with displays attached from behind.
Figure 2:
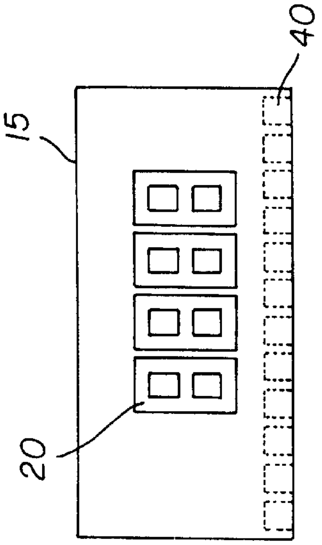
FIG. 2 is a front view of a seven segment display with display contacts on the reverse side.

FIG. 1 shows a shelf tag 10 comprised of one or more displays 15 constructed by forming patterned conductive character elements 20 on top and bottom substrates and sandwiched polymer stabilized liquid crystals between patterned character elements 20. The displays 15 can be made as shown in U.S. Ser. No. 10/134,185, filed Apr. 29, 2002 by Stephenson et al., which is incorporated herein by reference.

Shelf tag 10 has one or more perforated windows 18 to allow character elements 20 on displays 15 to be viewed from the front printable side 25 of a shelf tag 10. Printable surface 25 allows the addition of static readable information such as bar code and item description to be applied via printing means, one of which is an inkjet printer.

Figure 3:
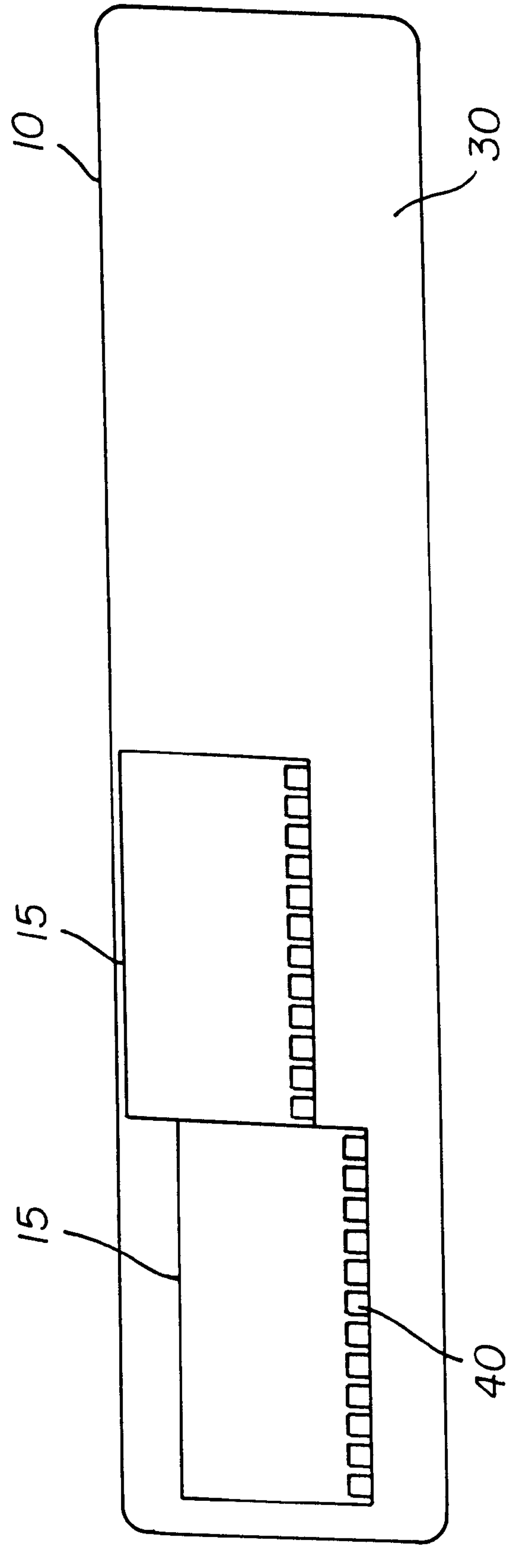
FIG. 3 is a perspective of the reverse (adhesive) side of a shelf tag with the displays attached.

FIG. 3 shows a shelf tag 10 having an adhesive backing 30 to allow attachment to a support as well as attachment of a display 15 to the back side of the shelf tag 10. Display 15 being attached to adhesive backing 30 provides exposed electrically conductive display contacts 40 on display 15 to face the rear of the shelf tag 10.

Figure 4:
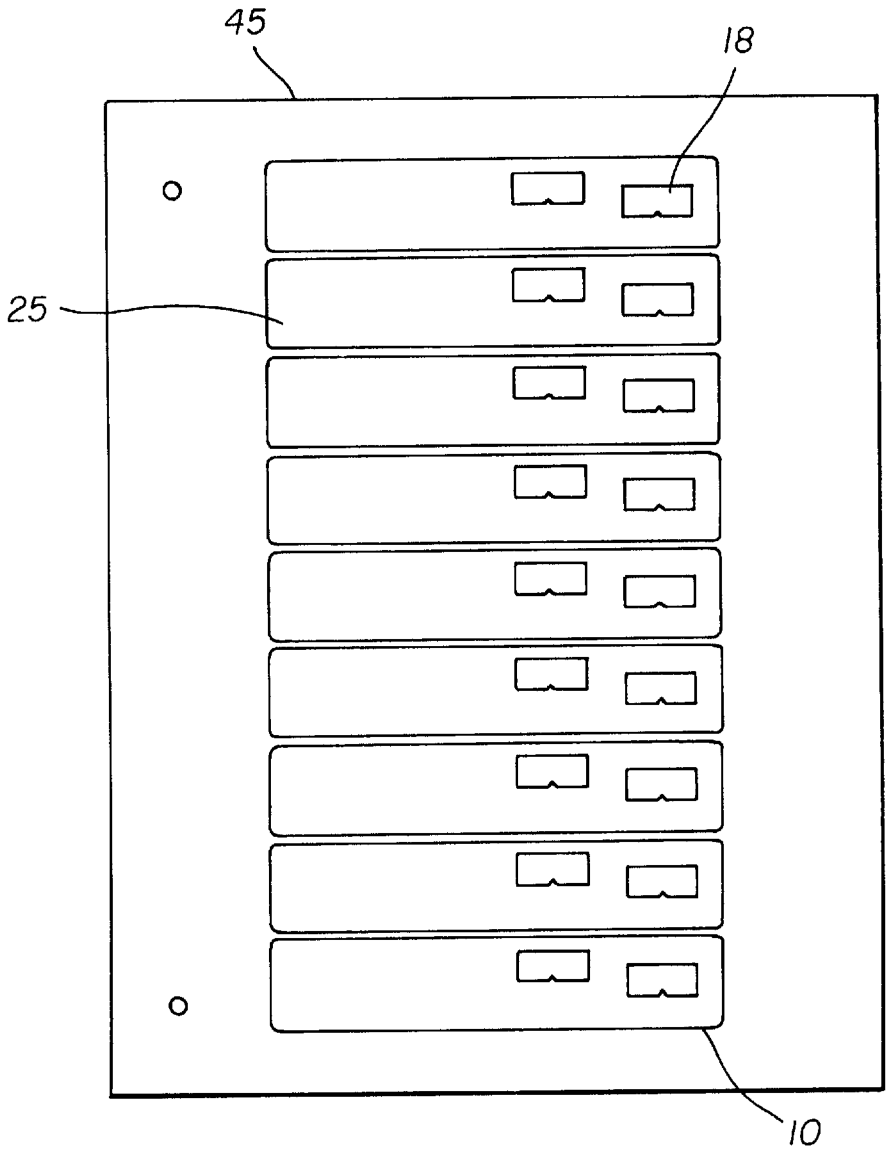
Figure 5:
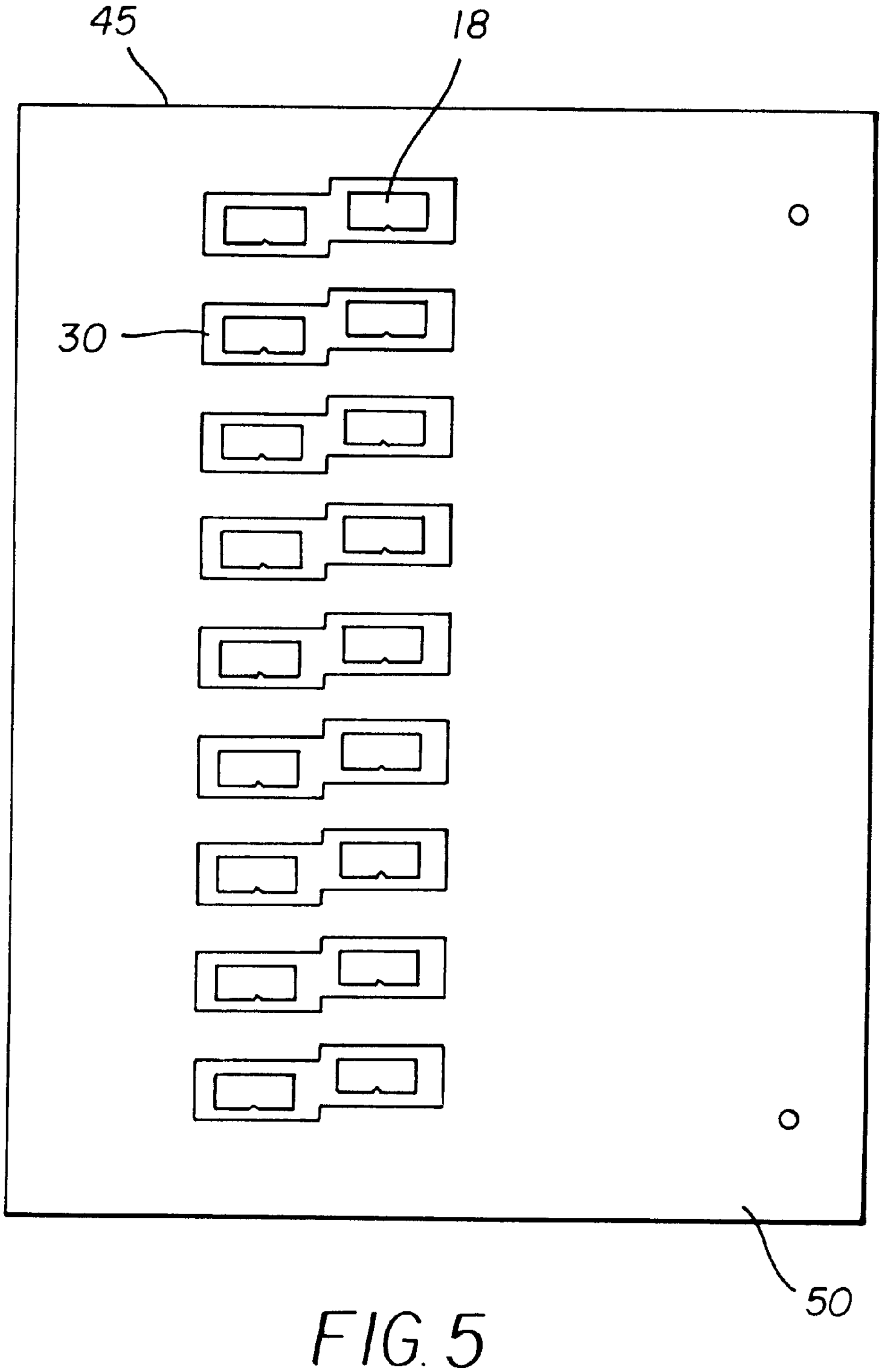
FIG. 5 is a rear view of the printable sheet of FIG. 4, showing the adhesive backer liner with perforated windows for the display to show through as well as a die cut insert in the liner which, when peeled off, exposes adhesive for the display to be adhered.
Figure 6:
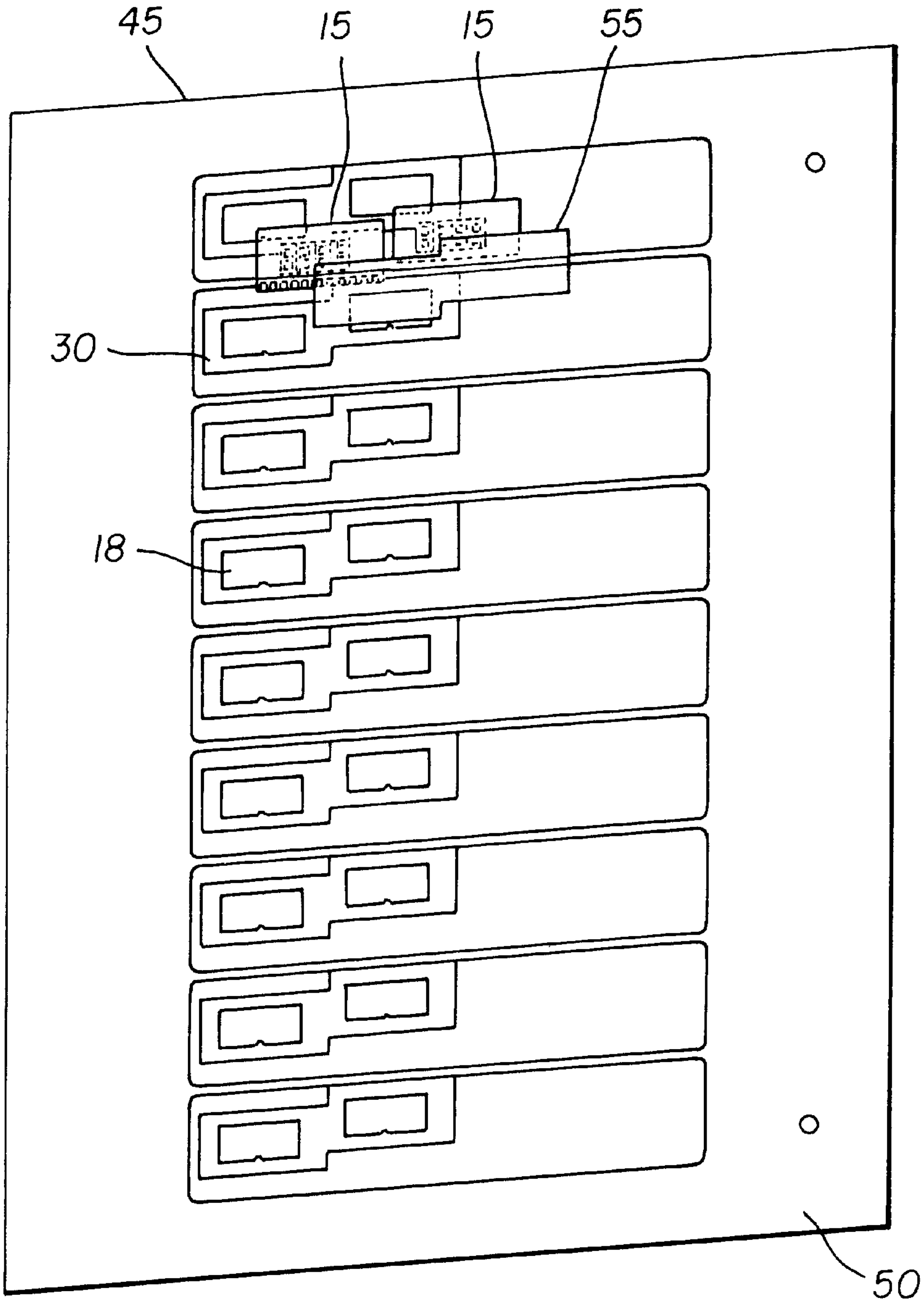
FIG. 6 is an exploded perspective view of the rear of a printable sheet showing the backer liner insert removed and the displays ready to be adhered.

FIGS. 4 and 5 show a plurality of shelf tags 10 originating on a printable media sheet 45. Perforated windows 18 are cut through the printable surface 25 and the adhesive backer liner 50. The plurality of shelf tags 10 are die cut through the printable media 25 only. FIG. 6 shows the reverse side of sheet 45 with the area around the perforated windows 18 being die cut through the backer liner 50 only, allowing a peel off segment 55 of the backer liner 50 to expose adhesive 30 for displays 15 to be attached.

Figure 7:
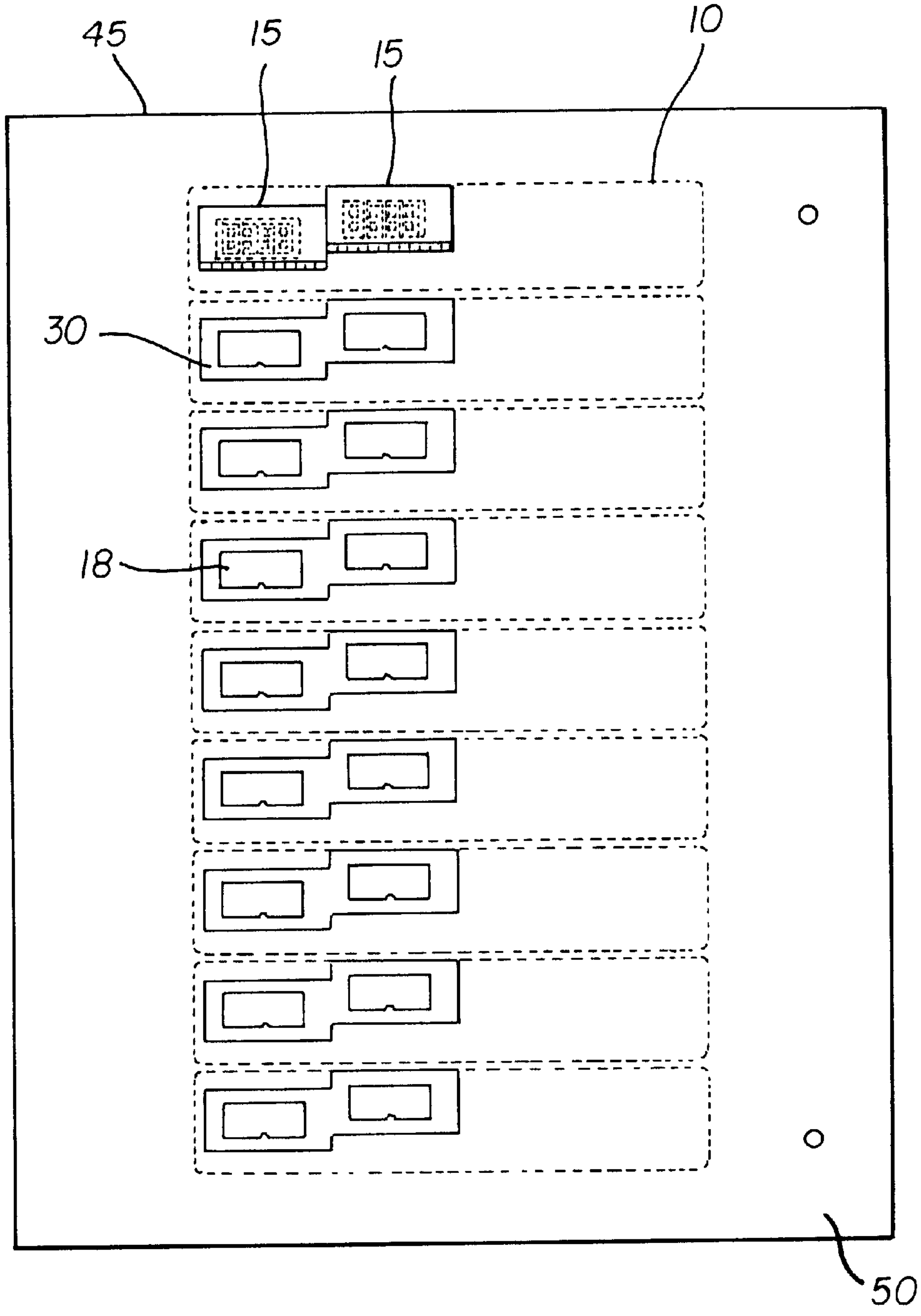
FIG. 7 is a rear view of printable sheet with adhesive backer liner with the displays in place in the opening of the backer liner.
Figure 8:
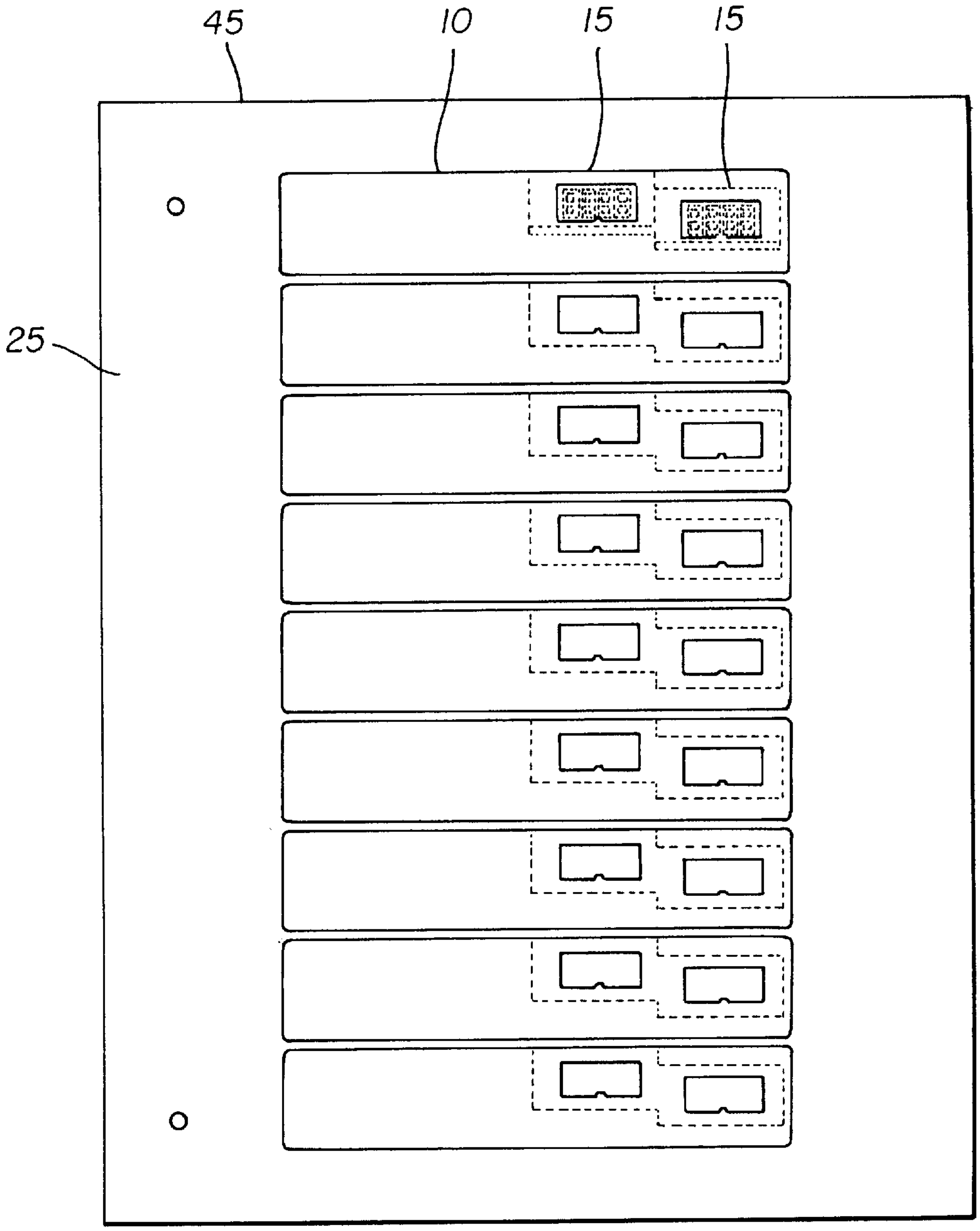
FIG. 8 is a front view of a printable sheet showing an array of die cut labels with displays showing through the perforated openings.

FIGS. 7 and 8 refer to the obverse and reverse sides respectively of sheet 45 showing completed shelf tag 10 with displays 15 in place and attached to adhesive backing 30. FIG. 1 shows a completed tag 10 with displays 15, singulated from printable sheet 45 and backer liner 50.

Figure 9:
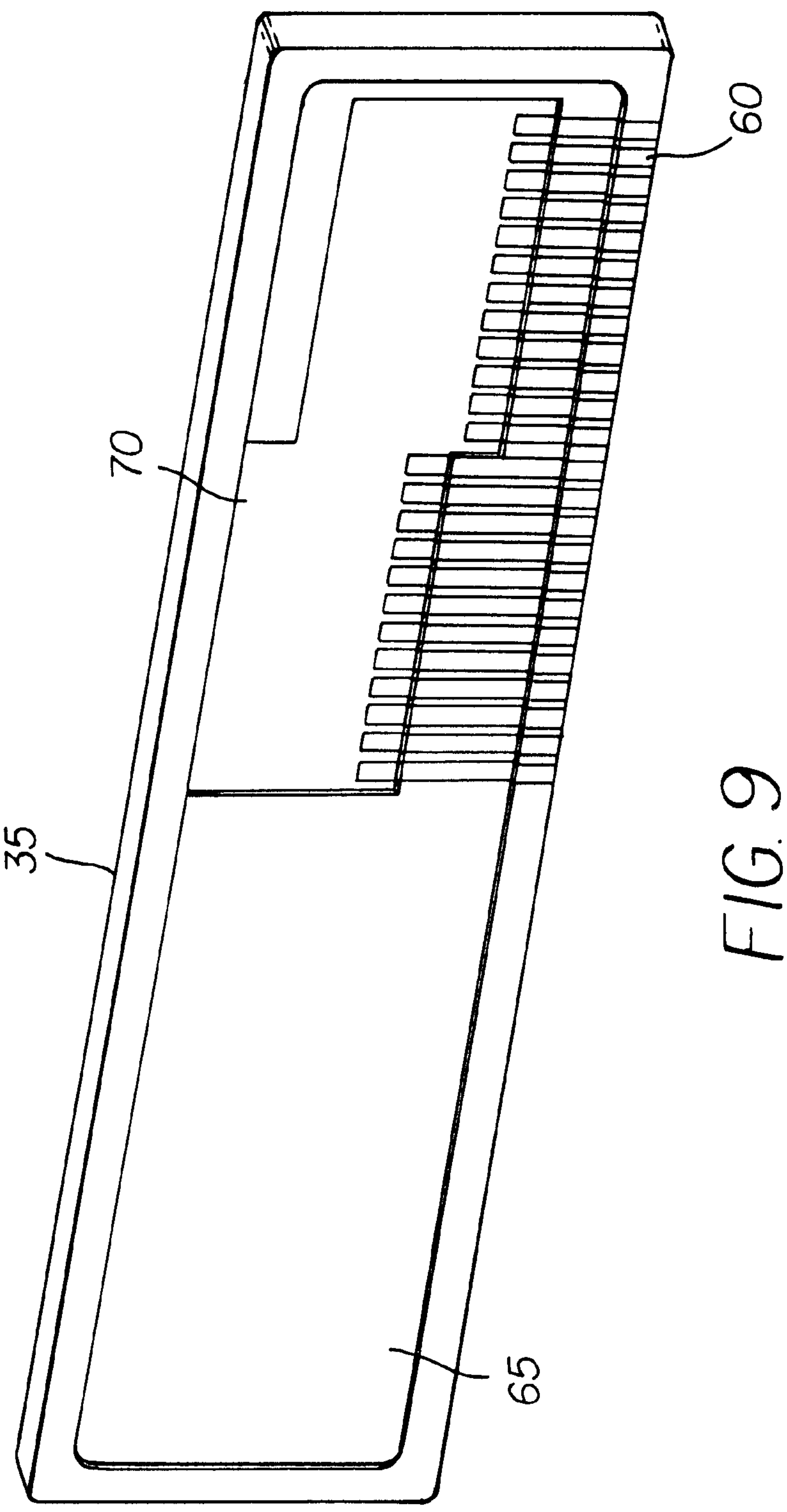
FIG. 9 is a front perspective view of a support with conductive strips inset into the surface and recesses for the shelf tag and displays.

FIG. 9 details a frontal perspective view of a support 35 with a plurality of conductive strips 60 inset within the support 35. In one embodiment, an injection molded support 35 has conductive strips 60 molded within it. The support 35 defines a recess 65 for aligning the shelf tag 10 onto the support 35 with the proper positioning so that the display contacts 40 form electrical connection with conductive strips 60. The support 35 also provides a clearance recess 70 for receiving the displays 15, allowing the shelf tag 10 to adhere flatly onto support 35 in recess 65.

Figure 10:
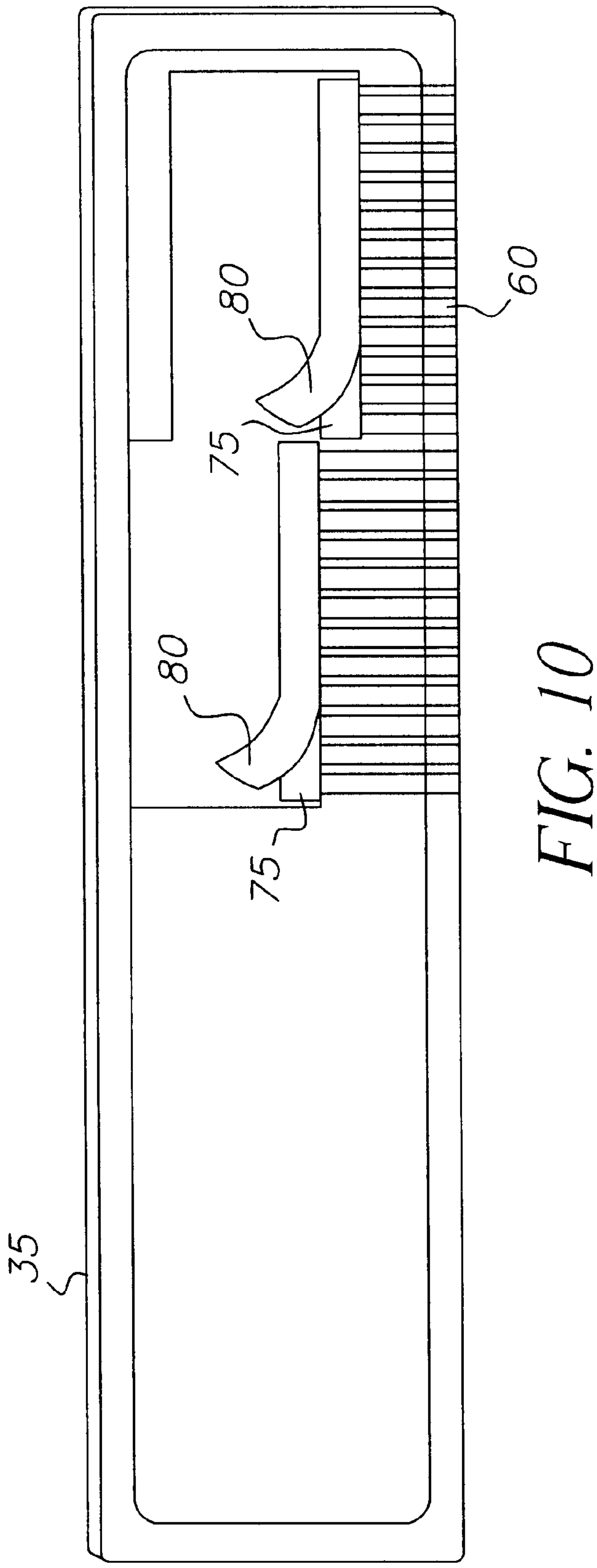
FIG. 10 is a perspective view of the front of a support having conductive strips inset into the surface with anisotropically conductive tape strips with adhesive backer liner positioned over the conductive strips.

FIG. 10 shows a front view of support 35 with conductive strips 60 and strips of anisotropic conductive adhesive tape 75 with backer liner 80 applied over the conductive strips 60. Once the backer liner 80 is removed, the anisotropic conductive adhesive 75 is exposed to mate with the conductive contacts 40 of display 15 as the shelf tag 10 is applied to support 35. The conductive adhesive 75 being adhered to the conductive contacts 40 on display 15 as well as adhered to the conductive strips 60 provides electrical contact between the conductive character elements 20 on display 15 and the conductive strips 60.

Figure 11:
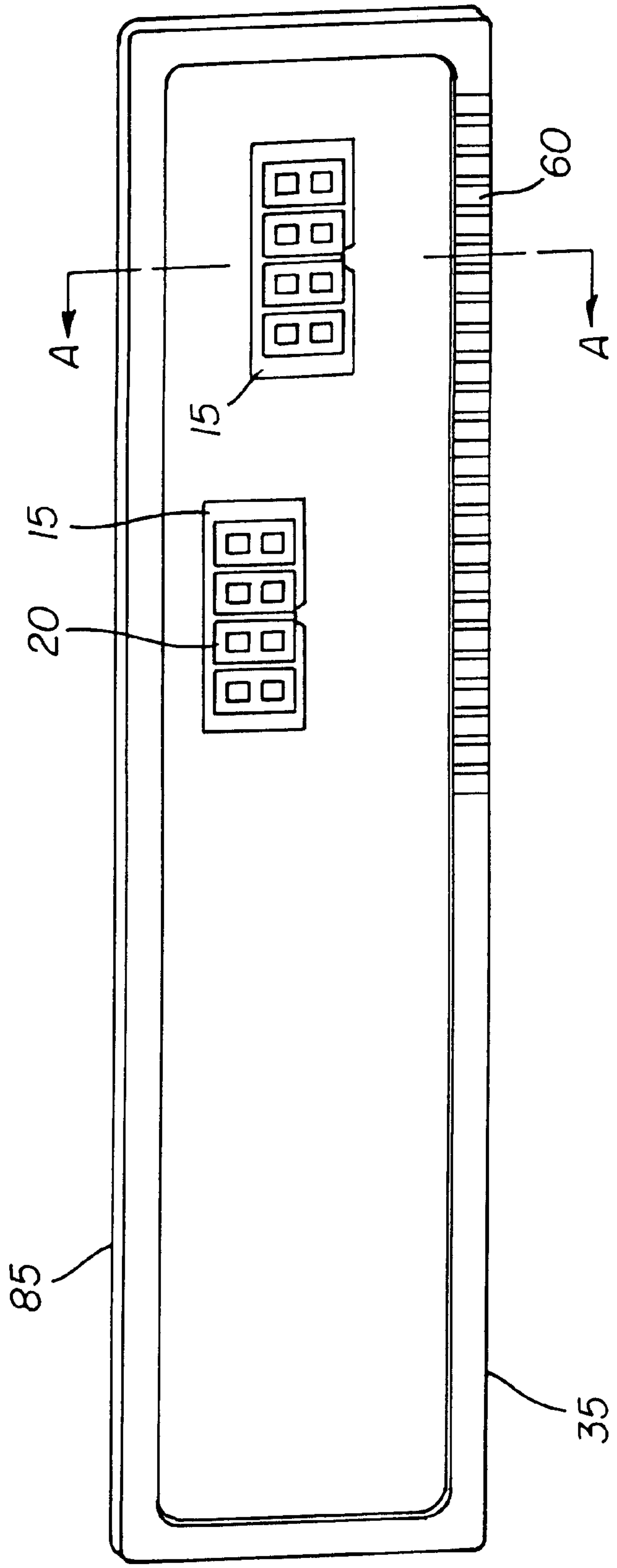
FIG. 11 is a perspective front view of a completed shelf tag assembly with conductive strips exposed along the bottom rim of the support available for electrical contacting to make changes to the display characters.

FIG. 11 illustrates a completed shelf tag assembly 85. The contact strips 60 are exposed to the front of support 35 to electronically program the changeable characters 20 on display 15.

Figure 12:
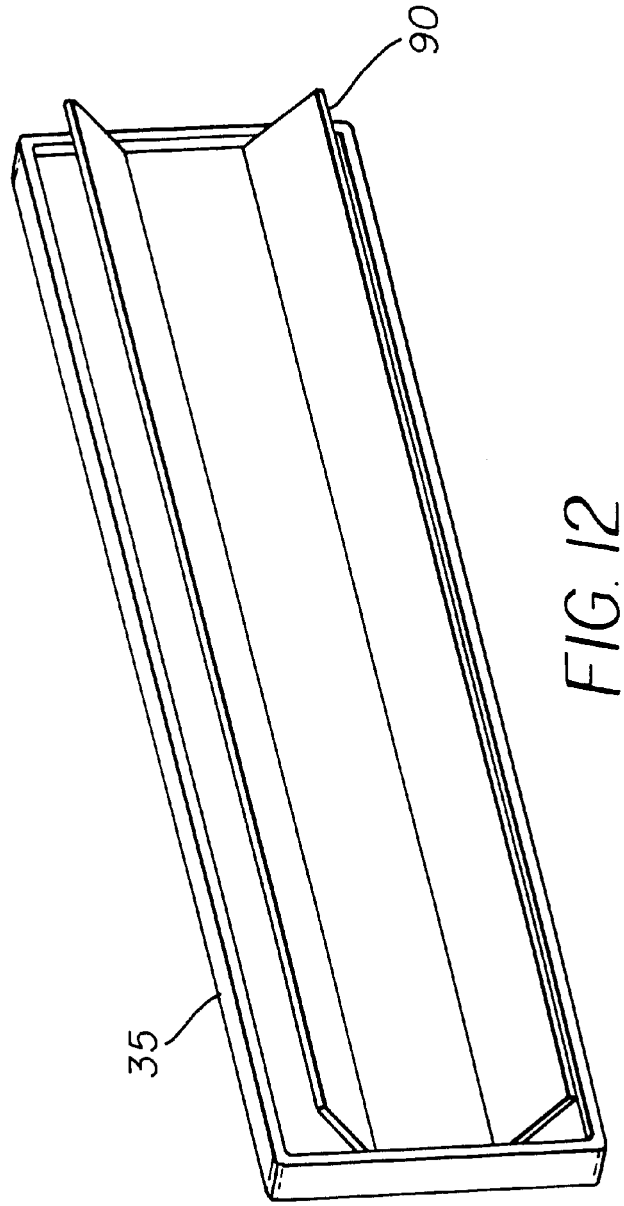
FIG. 12 is a back perspective view of a shelf tag having a bracket for attaching the shelf tag to an existing shelf tag rail system.

FIG. 12 shows a rear perspective view of an attachment bracket 90 to an existing shelf tag rail system.

Figure 13:
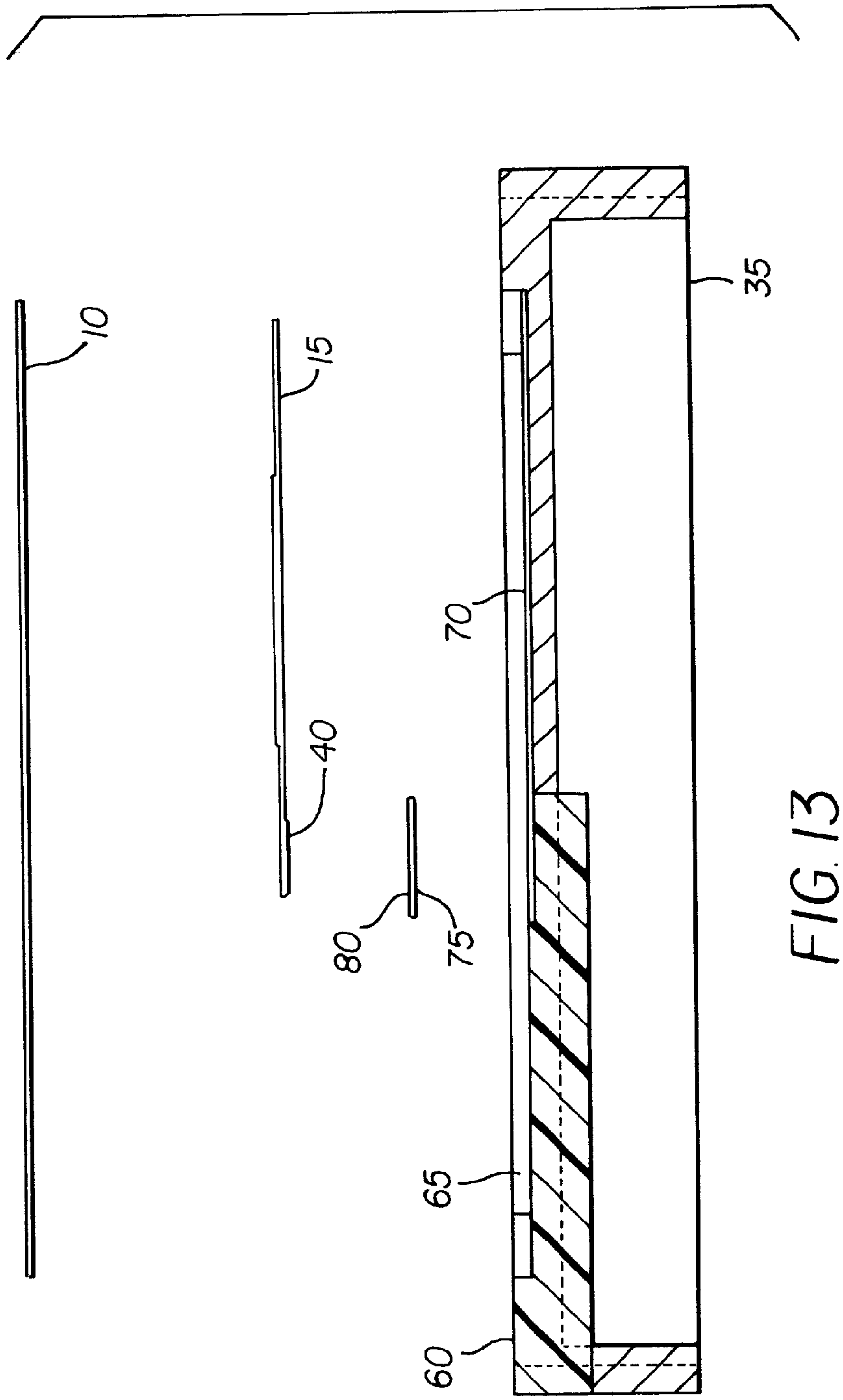
FIG. 13 is an exploded section view taken along section line A—A in FIG. 11 showing the shelf tag assembly.
Figure 14:
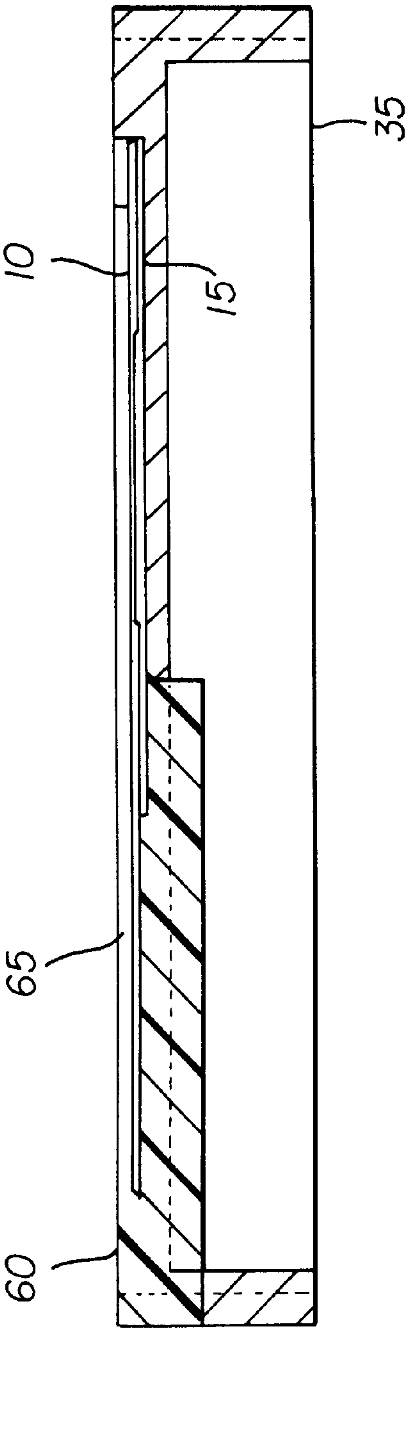
FIG. 14 is a section view taken along section line A—A in FIG. 11 showing the completed shelf tag assembly.

FIG. 13 details an exploded section view from FIG. 11, showing the elements of the assembly prior to attachment; and FIG. 14 shows a section view from FIG. 11 with all components in place.

The invention has been described in detail with particular reference to certain preferred embodiments thereof, but it will be understood that variations and modifications can be effected within the spirit and scope of the invention.

PARTS LIST

10 shelf tag
15 display
18 perforated windows
20 conductive character elements
25 printable side of label
30 adhesive backing
35 support
40 contacts on display
45 printable sheet
50 adhesive backer liner
55 peel off segment from backer liner
60 conductive strips
65 recess in support for positioning shelf tag
70 clearance for displays
75 conductive adhesive
80 conductive adhesive backer liner
85 shelf tag assembly
90 attachment bracket

What is claimed is:

1. A method of making a programmable shelf tag, comprising steps of:

a) providing a display element having a single flexible transparent substrate, one or more first transparent conductors located on the substrate, a layer of polymer dispersed material located over the first conductor(s), the polymer dispersed material being responsive to an applied electric field for displaying information and having first and second optical states that are both stable in an absence of an electrical field, one or more second conductors located over the polymer dispersed layer for applying the electric field to the polymer dispersed material between the first and second conductors and a plurality of display contacts located on backside of the display for making electrical connection to the first and second conductors of the display;

b) mounting the display element substrate side down in a window formed in a web of adhesive backed print medium having a die cut area around the display element to form an adhesive label that includes the display element;

c) printing static, information on the label of the print medium;

d) providing a support for mounting the adhesive label, the support including a plurality of support contacts having first conductive portions for providing contact to the first and second conductors of the display element and second conductive portions in an area outside the adhesive label for making electrical contact with the display from the front of the display element, the support including a layer of conductive adhesive over the first conductive portions of the support contacts; and e) attaching the adhesive label to the support such that the display contacts are in electrical contact with the support contacts via the conductive adhesive, whereby the first and second conductors are electrically addressable from the front side of the display assembly.

2. The method claimed in claim 1, further comprising the step of printing an image of a product on the adhesive label.

3. The method claimed in claim 1, further comprising the steps of providing a second display element and mounting the second display element in a second window formed in the adhesive label, and wherein the support includes conductors for providing contact to the second display element.

4. The method claimed in claim 1, wherein the static information includes information from the group comprising a universal product code, a product description, and a unit description.

5. The method claimed in claim 1, wherein the adhesive backed print media is inkjet print paper.

6. The method claimed in claim 1, wherein the support includes an attachment feature for attaching the support to an existing shelf tag rail system.

7. The method claimed in claim 1, wherein a plurality of die cut labels having display elements are formed on a sheet of the adhesive backed print medium.

8. The method claimed in claim 1, wherein the display element is mounted on the adhesive backed print medium by forming a first window smaller than the display element in the adhesive print material, forming a second window larger than the display element in a releasable backing layer, joining the adhesive print material and the releasable backing layer such that the larger window surrounds the smaller window to expose an adhesive border, and placing the display element in the larger window of the adhesive backing, whereby the display element is attached to the adhesive print material by the exposed adhesive border.

9. The method claimed in claim 1, wherein the adhesive backed print material is in a roll and the printing step is performed with a roll fed printer.

10. The method claimed in claim 1, wherein the adhesive backed print material is in a sheet and the printing step is performed with a sheet fed printer.

11. The method claimed in claim 1, wherein the conductive adhesive is an anisotropic adhesive.

12. A programmable shelf tag label, comprising:

a) a display element having a single flexible transparent substrate, one or more first transparent conductors located on the substrate, a layer of polymer dispersed material located over the first conductor(s), the polymer dispersed material being responsive to an applied electric field for displaying information and having first and second optical states that are both stable in an absence of an electrical field, one or more second conductors located over the polymer dispersed layer for applying the electric field to the polymer dispersed material between the first and second conductors and a plurality of display contacts located on the backside of the display for making electrical connection to the first and second conductors of the display; and b) a sheet of adhesive print medium having a die cut label area, and defining a window in the label area, the display element being mounted substrate side down in the window, and including a releasable backing layer, whereby static information can be printed on the label and the printed label can be removed from the backing layer and attached to a support having contacts for making electrical connection to the first and second conductors of the display element.

13. The label claimed in claim 12, wherein the static information is an image of a product on the adhesive label.

14. The label claimed in claim 12, further comprising a second display element mounted in a second window formed in the adhesive label, and wherein the support includes conductors for providing contact to the second display element.

15. The label claimed in claim 12, wherein the static information includes information from a group comprising a Universal Product Code, a product description, and a unit description.

16. The label claimed in claim 12, wherein the adhesive print media is inkjet print paper.

17. The label claimed in claim 12, wherein a plurality of die cut labels having display elements are provided on a sheet of the adhesive print medium.

18. The label claimed in claim 12, wherein the display element is mounted on the adhesive backed print medium in a first window smaller than the display element in the adhesive print material, and further comprising a releasable backing layer having a second window larger than the display element, the adhesive print material and the releasable backing layer being laminated such that the larger window surrounds the smaller window to expose an adhesive border, and the display element being located in the larger window of the adhesive backing, whereby the display element is attached to the adhesive print material by the exposed adhesive border.

19. The label claimed in claim 12, wherein the adhesive backed print material is in a roll whereby the static information can be printed with a roll fed printer.

20. The label claimed in claim 12, wherein the adhesive backed print material is in a sheet, whereby the static information can be printed with a sheet fed printer.

21. A support for receiving a programmable shelf tag label that includes a display element having a single flexible transparent substrate, one or more first transparent conductors located on the substrate, a layer of polymer dispersed material located over the first conductor(s), the polymer dispersed material being responsive to an applied electric field for displaying information and having first and second optical states that are both stable in an absence of an electrical field, one or more second conductors located over the polymer dispersed layer for applying the electric field to the polymer dispersed material between the first and second conductors and a plurality of display contacts located on backside of the display for making electrical connection to the first and second conductors of the display, and a sheet of adhesive print medium having a die cut label area, and defining a window in the label area, the display element being mounted substrate side down in the window, and including a releasable backing layer, whereby static information can be printed on the label and the printed label can be removed from the backing layer and attached to the support, the support comprising:

a) a body having a surface for receiving the programmable shelf tag, the body defining alignment features for precisely locating the tag on the surface;

b) contacts on the body having exposed portions on the surface and located with respect to the alignment feature for making electrical connection to the first and second conductors of the display element and exposed portions that extend beyond the display element, whereby the first and second conductors are electrically addressable from the front side of the shelf tag label; and c) conductive adhesive located over the exposed portions of the contacts on the receiving surface.

22. The support claimed in claim 21, wherein the adhesive is an anisotropic adhesive.

23. The support claimed in claim 21, further comprising an attachment feature for attaching the support to an existing shelf tag rail system.

24. The support claimed in claim 21, further comprising a releasable protective layer over the conductive adhesive.

25. The support claimed in claim 21, wherein the contacts are printed circuits on the body.

26. The support claimed in claim 21, wherein the body is an injection molded plastic part and the contacts are conductive plastic molded in the body.

27. The support claimed in claim 21, wherein the body is an injection molded plastic part and the contacts are metal conductors molded into the body.

28. The support claimed in claim 21, wherein the contacts are a conductive applique.

29. A display tag assembly, comprising:

a) programmable label, having:

i) a display element having a single flexible transparent substrate, one or more first transparent conductors located on the substrate, a layer of polymer dispersed material located over the first conductor(s), the polymer dispersed material being responsive to an applied electric field for displaying information and having first and second optical states that are both stable in an absence of an electrical field, one or more second conductors located over the polymer dispersed layer for applying the electric field to the polymer dispersed material between the first and second conductors and a plurality of display contacts located on backside of the display for making electrical connection to the first and second conductors of the display; and ii) a sheet of adhesive print medium having a die cut label area, and defining a window in the label area, the display element being mounted substrate side down in the window, and including a releasable backing layer, whereby static information can be printed on the label and the printed label can be removed from the backing layer and attached to a support having contacts for making electrical connection to the first and second conductors of the display element; and b) a support for receiving the label having:

i) a body having a surface for receiving the label, the body defining alignment features for precisely locating the label on the surface;

ii) contacts on the body having exposed portions on the surface and located with respect to the alignment feature for making electrical connection to the first and second conductors of the display element and exposed portions that extend beyond the display element, whereby the first and second conductors are electrically addressable from the front side of the display tag assembly; and iii) conductive adhesive located over the exposed portions of the contacts on the receiving surface.

30. The display tag assembly claimed in claim 29, wherein the static information is an image of a product on the adhesive label.

31. The display tag assembly claimed in claim 29, further comprising a second display element mounted in a second window formed in the adhesive label, and wherein the support includes conductors for providing contact to the second display element.

32. The display tag assembly claimed in claim 29, wherein the static information includes information from the group comprising a Universal Product Code description, and a unit description.

33. The display tag assembly claimed in claim 29, wherein the adhesive print media is inkjet print paper.

34. The display tag assembly claimed in claim 29, wherein a plurality of die cut labels having display elements are provided on a sheet of the adhesive print medium.

35. The display tag assembly claimed in claim 29, wherein the conductive adhesive is an anisotropic adhesive.

36. The display tag assembly claimed in claim 29, wherein the adhesive is an anisotropic adhesive.

37. The display tag assembly claimed in claim 29, wherein the support further comprises an attachment feature for attaching the support to an existing shelf tag rail system.

38. The display tag assembly claimed in claim 29, wherein the contacts are printed circuits on the body.

39. The display tag assembly claimed in claim 29, wherein the body is an injection molded plastic part and the contacts are conductive plastic molded in the body.

40. The display tag assembly claimed in claim 29, wherein the body is an injection molded plastic part and the contacts are metal conductors molded into the body.

41. The display tag assembly claimed in claim 29, wherein the contacts are a conductive applique.

* * * * *